Figure 1:
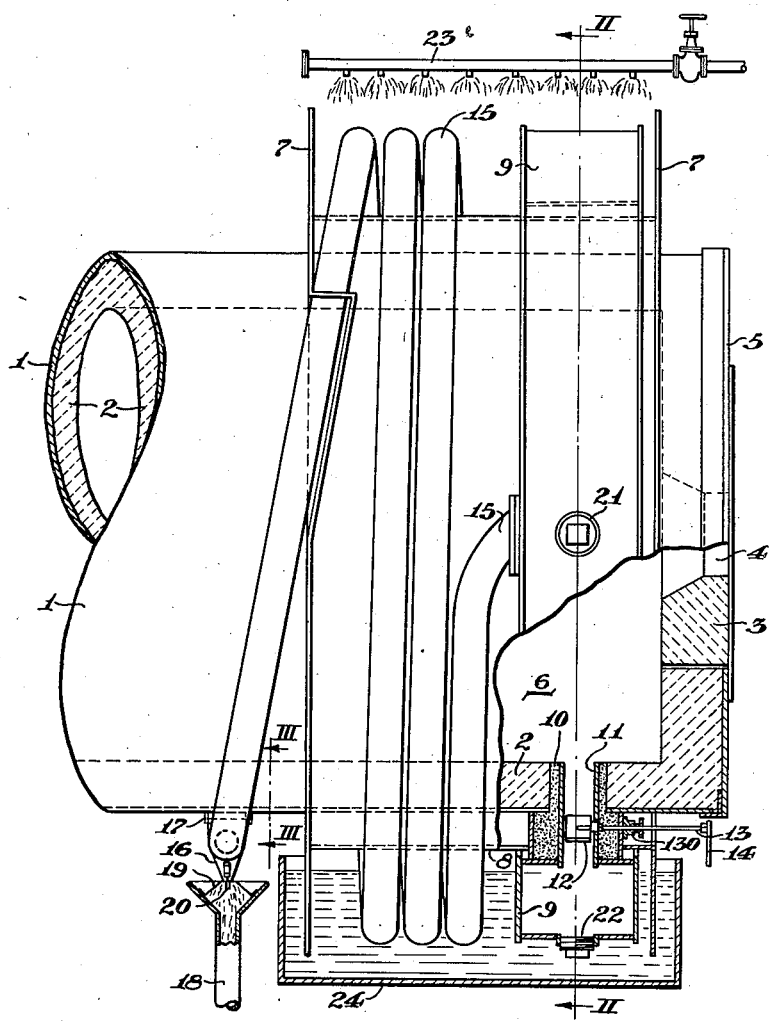

Nov. 21, 1944.     R. C. BUEHL     2,363,390
ROTARY KILN
Filed Feb. 3, 1943     2 Sheets-Sheet 1

INVENTOR.
Russell C. Buehl
BY Brown, Critchlow & Flick
his ATTORNEYS.

WITNESSES.
E. J. Maloney
Fulton B. Flick

Nov. 21, 1944.    R. C. BUEHL    2,363,390
ROTARY KILN
Filed Feb. 3, 1943    2 Sheets-Sheet 2

INVENTOR.
Russell C. Buehl
BY Brown, Critchlow & Flick
his ATTORNEYS.

WITNESSES.
E. J. Maloney

Patented Nov. 21, 1944

2,363,390

UNITED STATES PATENT OFFICE 2,363,390

ROTARY KILN

Russell C. Buehl, Wilkinsburg, Pa., assignor to Plastic Metals, Inc., Johnstown, Pa., a corporation of New York Application February 3, 1943, Serial No. 474,599

12 Claims. (Cl. 263—22)

This invention relates to the production in rotary kilns of materials, such as sponge iron, which are susceptible to oxidation during cooling from elevated temperatures, and to rotary kilns for such purposes.

The invention is applicable particularly to the production of sponge iron and for that reason it will be described, by way of illustration, with specific reference thereto. Sponge iron may be produced readily by heating a mixture of iron ore and a carbonaceous reducing agent, such as coke or coal, to a suitable temperature. It has been found that for this purpose direct fired rotary kilns are especially suitable. The reduction takes place rapidly at a relatively high temperature, of the order of 1800° F., but if the reduced iron is discharged immediately to the atmosphere, it oxidizes to a substantial extent, which is of course highly objectionable because the content of elemental iron in the sponge is thereby decreased. The best practice known prior to the present invention was to discharge the hot sponge through a hooded spout or a discharge tube which protected it from contact with air and fed it to a hopper provided with cooling coils, a water jacketed worm, or similar means for cooling it. Such practice was not wholly satisfactory, however, because of difficulties in maintaining an air-tight seal between the furnace and the cooling means, and in cooling the material at an adequate rate while maintaining satisfactory kiln output. In consequence of such factors the sponge iron produced heretofore has been oxidized to an undesirable extent.

It is among the objects of the present invention to provide a rotary kiln process of producing sponge iron and other materials, which must be cooled before being discharged to the air, which represses to a minimum oxidation of the product as it is discharged from the kiln, and which is simple, easily practiced and does not require complicated apparatus or interfere with existing kiln practice.

A further object is to provide a rotary kiln which is particularly adapted for use in the production of sponge iron and other materials which are susceptible to oxidation at elevated temperatures or must be cooled before coming into contact with air, which is of simple construction and may be used in conformity with existing operating practice, is sturdy, does not increase the length of floor space required, and whose use materially improves the results to be had.

Other objects will appear from the following description.

Figure 2:
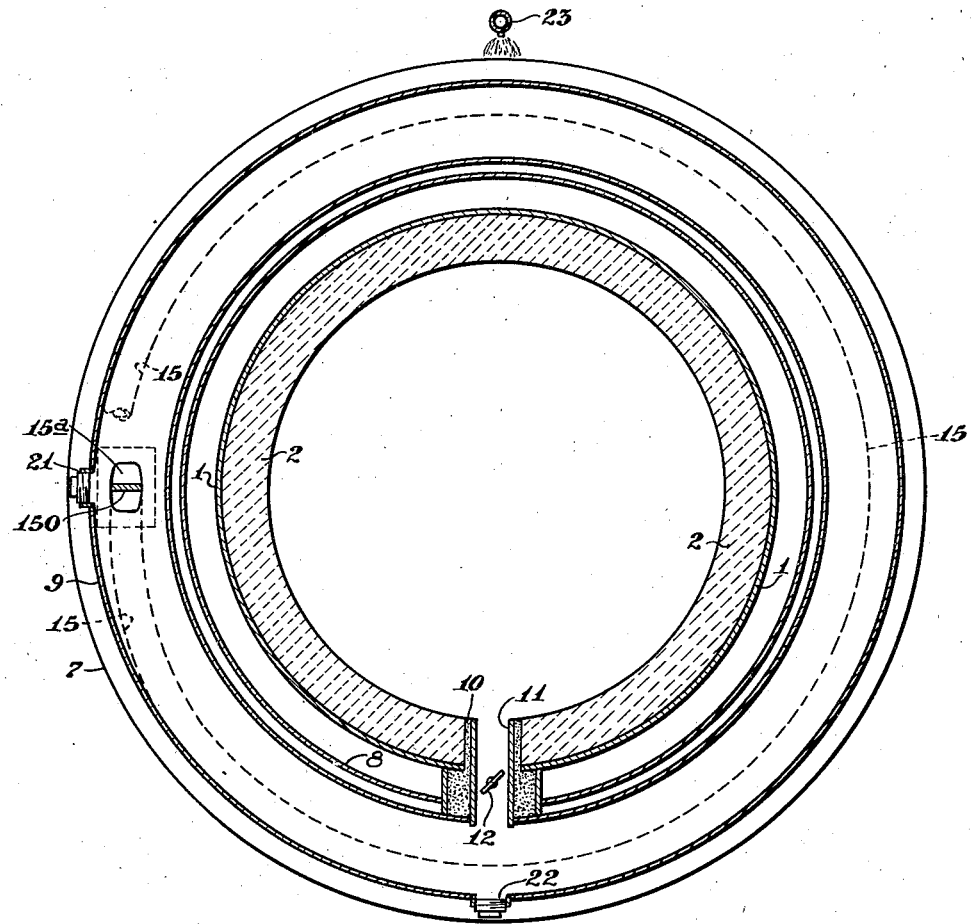
Figure 3:
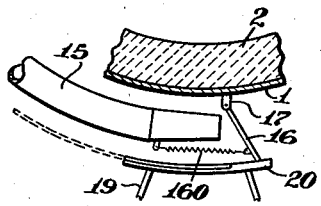

The invention will be described in connection with the accompanying drawings in which Fig. 1 is a vertical elevation, partly in section, longitudinally of the discharge end of a rotary kiln in accordance with the invention; Fig. 2 a cross sectional view taken on line II—II, Fig. 1; Fig. 3 a fragmentary sectional view taken on line III—III, Fig. 1, showing one embodiment of valve means for effecting periodic discharge of the furnace product; and Fig. 4 a view similar to Fig. 3 showing the valve means in closed position.

In accordance with the present invention sponge iron is produced by passing a mixture of iron ore and a suitable carbonaceous reducing agent through a direct fired rotary kiln to effect reduction of the ore and produce sponge iron, e. g., in accordance with practice standard in the art. The hot sponge iron produced is discharged from the furnace, while protecting it from contact with air or other oxygen-containing gases, into a drum, most suitably one which surrounds the kiln adjacent its discharge end and rotates with the kiln, which provides a cooling chamber in which the sponge iron is partly cooled. It is then discharged from the drum into a discharge pipe which is coiled peripherally around the kiln and rotates with it. The primary function of this coil is to provide an automatic seal which prevents air from entering the drum, but it may be, and preferably is, of such diameter and length that in its travel therethrough the sponge iron is further cooled so that it is at a temperature at which substantial oxidation does not occur when it is discharged into contact with air. Preferably, the drum surrounds the end of the furnace and the pipe is coiled so that the material moves through it counter to its movement through the kiln.

The drawings represent an illustrative embodiment of the invention. Fig. 1 shows the discharge end of a rotary kiln of conventional construction comprising a metallic shell 1 provided with a suitable refractory lining 2. Mounted in the end of the kiln is a refractory burner ring 3 whose opening 4 receives a burner, not shown, which may be of any suitable type, such as a gas, oil or powdered coal burner. The burner is supported by an end plate 5 in such manner as to avoid seepage of air into the kiln chamber 6.

Mounted exteriorly of the kiln and connected to shell 1 are a pair of spaced metallic ring members 7 which support a tubular metallic baffle member 8 concentrically of and in spaced relation to the shell. Surrounding baffle 8 immediately adjacent the discharge end of the kiln is a drum member 9, suitably of rectangular cross section, formed from metallic sheet or plate and connected, as by welding, to baffle 8. The sponge iron, or other product, from the kiln is discharged into the drum through an opening 10 in the kiln wall which is provided with a liner 11, suitably of a high chromium-nickel steel, such as 18—8 or other alloy steel which is resistant to oxidation at elevated temperatures. Mounted within tube 11 is a butterfly valve 12 carried by a stem 13 provided with a handle member 14 for adjustment of the opening to regulate the size of material that can pass from the kiln into the cooling drum, or the rate of discharge from the kiln to the drum. Stem 13 extends through a packing gland 130 which prevents leakage of air into the kiln.

Connected to the side wall of drum 9, most suitably at a point remote from the point where tube 11 enters it, is a pipe 15 which is coiled around the periphery of the kiln, preferably a plurality of times, between members 7, as seen in Fig. 1. Ring members 7 and baffle 8 serve a function described hereinafter.

Figure 4:
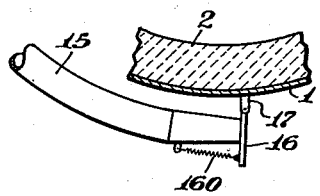

An important feature of the invention in its preferred embodiment resides in providing the outer end of pipe 15 with flow control means, one embodiment of which is shown in Figs. 1, 3 and 4. As appears particularly from Fig. 3, a gate member 16 is pivotally connected to a support 17 carried by kiln shell 1, and normally it is urged against the opening of the pipe, to close it as seen in Fig. 4, by a spring member 160 connected at one end to pipe 15 and at the other to valve member 16. Mounted beneath the kiln is a hopper member 18 provided with supporting means 19 for carrying a stationary trip member 20 positioned to strike gate 16, as shown in Fig. 3, during the travel of the end of pipe 15 over the hopper 18, to open it against the tension of spring 160 and permit the furnace product to be discharged from the pipe into the hopper. The hopper may be elongate corresponding to the period of the valve opening, and most suitably trip member 20 is mounted for adjustment longitudinally of itself in support 19 to permit adjustment of the time and length of opening of the valve. This permits regulation of the quantity of material which is discharged through the gate with each revolution of the kiln, which in turn controls the dwell of the sponge iron in pipe 15, and consequently regulation of the rate of cooling of the material prior to contact with the atmosphere.

If desired, clean-out openings 21 and 22 may be provided opposite the connection between drum 9 and pipe 15 and opposite the discharge tube 11, respectively.

In the use of kilns as thus provided, and in accordance with the method provided by the invention, a charge of the material to be treated in the kiln, such as a mixture of iron ore and coal or other carbonaceous reducing agent, is fed to the entry end of the kiln and moves through it as the kiln is rotated. During its travel it is heated and the desired reaction or other result takes place, in this instance reduction of the iron ore to sponge iron. When the treated material reaches the discharge end, rotation of the kiln causes a portion of it to pass with each revolution through tube 11 into the chamber provided by cooling drum 9, the discharge action being governed by the position of butterfly valve 12. In normal operation of such a kiln in the production of sponge iron it has been found that satisfactory results are to be had by having the valve in the 45° position shown in Fig. 2. This permits the passage of material which will move freely through the drum and the discharge pipe, but prevents the passage of large particles or lumps which might clog the cooling system. If the discharge opening from the kiln to the drum becomes clogged with such oversize material, all that it is necessary to do is to open the valve fully when the kiln has moved to bring it to its uppermost position, whereupon the oversize material will fall downwardly into the kiln.

With each rotation of the kiln some of the sponge iron carried in the cooling drum will find its way through outlet 15a, Fig. 2, into discharge pipe 15. However, the construction is such that, as will be understood, the product from the kiln will tend to accumulate and remain for a substantial period of time within the cooling drum, and this effect may be controlled by the trip valve 16. Its dwell in the drum serves to effect substantial cooling prior to the time when it enters the discharge pipe and thus improves the cooling operation. Also, in normal, continuous operation of the kiln the coils of pipe 15 will be largely filled with the furnace product, and the use of a coil thus serves very effectively to build up a seal that prevents air from reaching the material in the hot zone, where it is most likely to undergo serious oxidation. Means may be provided also to exclude from the coil lumps or balls of material of such size as might lodge in the coil and plug it. For example, a bar 150 may be welded or otherwise mounted in opening 15a; any material which passes to either side of the bar will be small enough to move freely through the coil.

The entry of air is further prevented by the trip valve 16. This valve also serves to keep the coils of pipe 15 and drum 9 more nearly filled because it retards, in controlled fashion, the rate of discharge and thus serves to prolong the stay of the material in the cooling system. This reduces appreciably the temperature of the sponge iron, or permits more material to be cooled to the same discharge temperature. As an illustration, if pipe 15 consists of 9 coils and the kiln speed is 2 R. P. M., then with no valve at the open end of the pipe the material will pass through the coils in 4½ minutes. By providing trip valve 16, or some other form of controllable discharge gate, it is possible to keep the material in the coils for as much as 20 minutes with the same average discharge rate.

The material within the drum and discharge pipe will be cooled by loss of heat to the atmosphere, but the rate of cooling can be, and preferably is, accelerated, as by spraying water upon the top of the coils from a spray head 23, and by providing a tank 24 through which water is circulated to submerge the lower ends of the pipe coil and cooling drum, as seen in Fig. 1. Members 7 act as shields to direct the water spray upon the coil, and with baffle 8 they serve to prevent chilling of the shell of the kiln by the water. Inasmuch as the material being cooler always lies in the lower portions of the drum and coil in its passage from the kiln to the discharge end of pipe 15, cooling at a maximum rate is attained in this manner, and by spraying water from the top this action is assisted because the exposed portions are cool when they come into contact with the hot material toward the bottom of their travel. When the drum and coil move through a water bath as just described, the final coil or two should be of smaller diameter than the remainder of the coil, as shown in Fig. 1, so that the discharge end can be positioned outside of the cooling tank, as seen in Fig. 1.

Hopper 18 serves to direct the cooled furnace product as desired, e. g. to a conveyor which carries it to a storage bin.

Commercial operation of a kiln in accordance with this invention, for production of sponge iron, has shown that the use of a cooling drum and discharge coil serve their purpose much more effectively than any means proposed heretofore. The material remains in the drum a relatively long time before finding its way into the coil, and this plays an important part in the degree of cooling attained. Also, it permits the use of a relatively short coil as compared with the use of a discharge coil which would receive the hot sponge iron from the kiln.

Various modifications are, of course, permissible. Thus, the position of the drum and coil might be interchanged, or the drum made an extension of the kiln. Also, the coil 15 need be only long enough to act as a seal instead of passing around a plurality of times. The embodiment shown is preferred, however, because the length of a standard kiln is not increased, stress on the kiln bearing is reduced as compared with a construction in which the drum forms an extension of the kiln, the coil acts as a supplementary cooling means, and the end is more accessible for cleaning or burner adjustment and repair.

According to the provisions of the patent statutes, I have explained the principle and method of practicing my invention and have described what I now consider to represent its best embodiment. However, I desire to have it understood that, within the scope of the appended claims, the invention may be practiced otherwise than as specifically described.

I claim:

1. The combination with a rotary kiln of an airtight cooling drum associated with the discharge end of the kiln, a discharge connection between said end of the kiln and said drum, and a discharge pipe having one end connected to said drum, coiled about the periphery of the kiln.

2. The combination with a rotary kiln of an airtight cooling drum associated with the discharge end of the kiln, a discharge connection between said end of the kiln and said drum, a butterfly valve mounted in said connection for controlling flow of solid matter from the kiln to the drum, and a discharge pipe having one end connected to said drum at a point remote from said connection opening and coiled about the periphery of the kiln.

3. The combination with a rotary kiln of an airtight cooling drum surrounding the discharge end of the kiln to rotate therewith, an opening through the wall of said end of the kiln into said drum, adjustable means associated with said opening for controlling flow of solid matter from the kiln to the drum, and a discharge pipe having one end connected to said drum and coiled a plurality of times about the periphery of the kiln.

4. The combination with a rotary kiln of an airtight cooling drum surrounding the discharge end of the kiln to rotate therewith, an opening through the wall of said end of the kiln into said drum, and a discharge pipe having one end connected to said drum and coiled a plurality of times about the periphery of the kiln.

5. The combination with a rotary kiln of an airtight cooling drum surrounding the discharge end of the kiln to rotate therewith, an opening through the wall of said end of the kiln into said drum, adjustable means associated with said opening for controlling flow of solid matter from the kiln to the drum, and a discharge pipe having one end connected to said drum and coiled a plurality of times about the periphery of the kiln in a direction such that the material passes through it in a direction opposite that of its movement through the kiln.

6. The combination with a rotary kiln of an airtight cooling drum surrounding the discharge end of the kiln to rotate therewith, an opening through the wall of said end of the kiln into said drum, a butterfly valve mounted in said connection opening for controlling flow of solid matter from the kiln to the drum, and a discharge pipe having one end connected to said drum at a point remote from said connection opening and coiled a plurality of times about the periphery of the kiln in a direction such that the material moves through it in a direction opposite that of its movement through the kiln.

7. A combination according to claim 1, the free end of said pipe being provided with intermittently acting discharge valve means.

8. A combination according to claim 4, the free end of said pipe being provided with intermittently acting discharge valve means.

9. A combination according to claim 6, the free end of said pipe being provided with intermittently acting discharge valve means.

10. The combination with a rotary kiln of an airtight cooling drum associated with the discharge end of the kiln, an opening through the wall of said end of the kiln into said drum, adjustable means associated with said opening for controlling flow of solid matter from the kiln to the drum, a discharge pipe having one end connected to said drum at a point remote from said opening and coiled about the periphery of the kiln, a spring-impelled gate member normally closing the free end of said pipe, and trip means mounted to open said gate periodically.

11. The combination with a rotary kiln of an airtight cooling drum surrounding the discharge end of the kiln to rotate therewith, an opening through the wall of said end of the kiln into said drum, adjustable means associated with said opening for controlling flow of solid matter from the kiln to the drum, a discharge pipe coiled a plurality of times around the periphery of the kiln in a direction opposite that of movement of the charge through the kiln, one end of said pipe being connected to said drum at a point remote from said opening, a spring-impelled gate member normally closing the other end of said pipe, and trip means mounted to engage said gate with each revolution of the kiln for opening it during a predetermined period of time.

12. A combination according to claim 11, said trip means being adjustable to vary the point at which said gate member is open.

RUSSELL C. BUEHL.